H. H. YOUNG.
BRACE.
APPLICATION FILED NOV. 30, 1917.
1,289,347.
Patented Dec. 31, 1918.
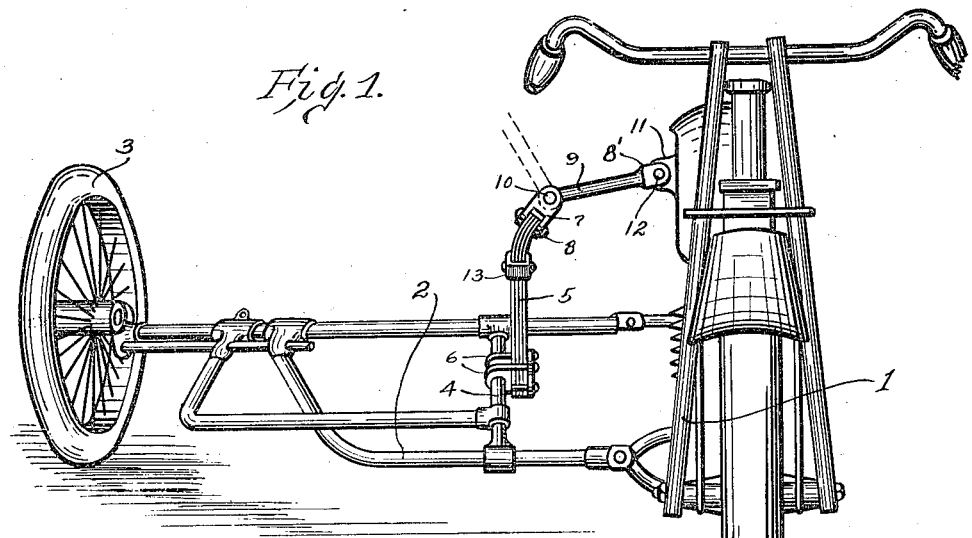
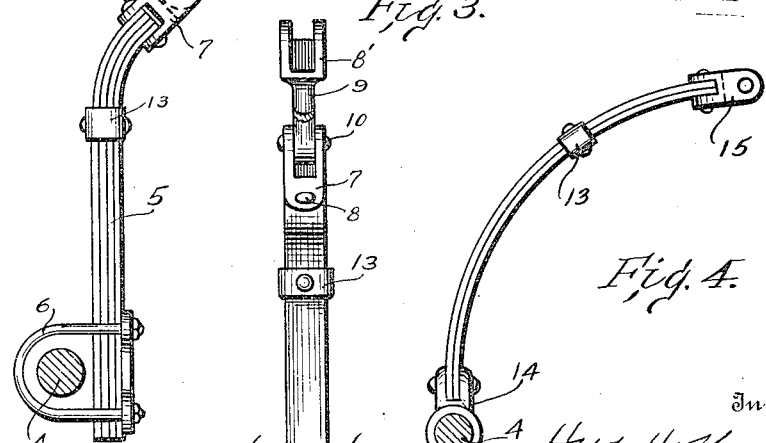

UNITED STATES PATENT OFFICE.

HUGO H. YOUNG, OF LOUDONVILLE, OHIO.

BRACE.

1,289,347.  Specification of Letters Patent.  Patented Dec. 31, 1918.

Application filed November 30, 1917. Serial No. 204,725.

*To all whom it may concern:*

Be it known that I, HUGO H. YOUNG, a citizen of the United States of America, residing at Loudonville, in the county of Ashland and State of Ohio, have invented certain new and useful Improvements in Braces, of which the following is a specification.

This invention relates to a yielding laminated brace for side cars for motor cycles or the like.

The primary object of the present invention is to construct a yielding laminated brace which is preferably rigidly attached to the frame of the side car at one end with its opposite end pivotally attached to the motor cycle for the purpose of maintaining same in a vertical position if desired, and to provide means to disconnect the brace from the motor cycle when it is not desired to use the brace and to afford facilities for moving the brace to a position that will not interfere with or obstruct the driver when not in use.

A further object is to provide a laminated brace of yielding resilient material with means for pivotally connecting the same to a side and motor car.

These and other objects are attained by the mechanism illustrated in the accompanying drawing, in which:

Figure 1 is a front view of a conventional type of motor car and side car frame showing the invention applied thereto.

Fig. 2 is a side elevation of a detail assembled view of the invention.

Fig. 3 is a side elevation of a detail assembled view of the invention taken at right angles to Fig. 2.

Fig. 4 is a side elevation of a detail assembled view of a modification of the invention.

Referring to Figs. 1, 2 and 3 of the drawings, reference numeral 1 represents a motor cycle, 2 the frame of a side car, 3 the supporting wheel thereof and 4 a cross connecting bar of the side car frame. The brace comprises in part the laminated portion 5 which is attached to the frame bar 4 by the U-shaped clamping bolts 6 and a joint 7 which is pivotally attached to the free end thereof by a pin 8. A link 9 is attached to the pivoted joint 7 by a pin 10. The opposite end 8' of the link 9 is preferably bifurcated and is pivotally connected to an ear or projection 11 provided on the motor cycle by a bolt 12.

When the driver does not desire to use the brace, the bolt 12 is removed and the link mechanism is moved to the dotted line position shown in Fig. 1. The laminated parts are preferably held in juxtaposition by a sleeve 13. In the modification shown in Fig. 4, the entire brace is comprised of laminated resilient material and the brace is preferably pivotally attached to the cross-bar 4 by a frictional clamping bracket 14 and its opposite end is pivotally attached to a joint 15 which in turn is pivotally attached to the motor cycle by a pin 12 as hereinbefore described.

Attention is called to the fact that a laminated resilient brace permits yielding movement of the motor cycle and side car with respect to each other when subjected to undue strain due to traveling over rough or irregular roads and in the event of one of the laminated parts breaking, the cars remain braced with respect to each other by the unbroken laminated parts, thereby providing a factor of safety in driving the cars not incident to a brace comprising a single part.

It will be further noted that the laminated resistant brace as herein described permits the driver to use the brace if he so desires or disconnect same and drive the car without the use of the brace.

What I claim is:—

1. A laminated resilient brace for connecting a motor cycle and side car, comprising means for attaching one end to the motor car and the opposite end to the frame of the side car.

2. A laminated resilient brace for connecting a motor cycle and side car comprising means for detachably connecting one end of the brace to the motor cycle and rigidly connecting the opposite end of the brace to the frame of the side car.

3. A laminated resilient brace attached at one end to a side car frame in combination with a link which is pivotally attached to the brace at one end and having its opposite end pivotally attached to a motor cycle.

4. A laminated resilient brace in combination with a link and means for attaching said link and brace to a motor cycle and side car frame.

5. A laminated resilient brace in combination with means for pivotally connecting said brace to a motor cycle and side car.

6. A laminated resilient brace in combination with means for pivotally connecting said brace to a motor cycle and side car including means for disconnecting the brace from the motor cycle and changing its position.

7. A laminated resilient brace for connecting a motor cycle and side car comprising means for detachably connecting one end of the brace to the motor cycle and connecting the opposite end of the brace to the frame of the side car.

8. A flexible and resilient brace in combination with means for pivotally connecting said brace to a motor cycle and side car.

9. A laminated resilient brace in combination with means for connecting said brace to a motor cycle and side car.

In testimony whereof I affix my signature.

HUGO H. YOUNG.

Copies of this patent may be obtained for five cents each, by addressing the "Commissioner of Patents, Washington, D. C."